March 8, 1955     R. P. JUDKINS     2,703,861
EXCITATION SYSTEM FOR GENERATORS
Filed Oct. 23, 1951
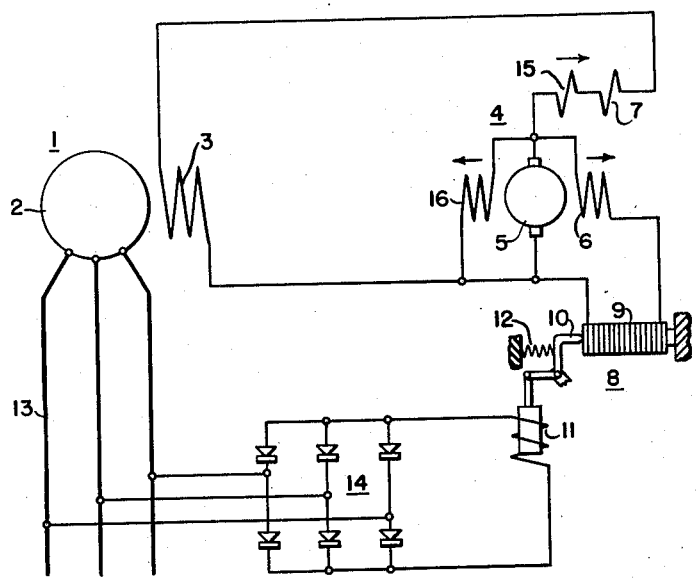
WITNESSES:
INVENTOR
Raymond P. Judkins.
BY
ATTORNEY though the armature in the direction opposite to its normal direction. Furthermore, the flux through the exciter field winding 6 decreases rapidly since the voltage regulator 8 attempts to reduce the exciter voltage to correct for the increase in alternator field current. Thus there is a rapidly decreasing flux in the exciter, and a large voltage drop across its armature in opposition to the normal direction of current flow, with the result that the voltage of the exciter reverses, and thus the polarity of the exciter is reversed.

2,703,861

EXCITATION SYSTEM FOR GENERATORS

Raymond P. Judkins, Lima, Ohio, assignor to Westinghouse Electric Corporation, East Pittsburgh, Pa., a corporation of Pennsylvania Application October 23, 1951, Serial No. 252,643

9 Claims. (Cl. 322—28)

The present invention relates to the excitation of alternating-current generators, and more particularly to the problem of preventing polarity reversal of a direct-current exciter under certain transient and fault conditions.

The excitation system of the present invention is particularly suitable for use in alternating-current generating systems for aircraft use, although it will be apparent that its usefulness is not restricted to this particular application. The alternating-current generator systems used on aircraft, which may be of either the constant frequency or variable frequency type, usually consist of an alternator, a direct-current exciter, and voltage regulating and control means. The exciter is a self-excited, direct-current shunt generator, and the alternator voltage is controlled by a voltage regulator, usually of the carbon pile type, which senses the alternator output voltage and controls the current of the exciter shunt field winding to maintain the desired voltage. In such a system, there is a strong tendency for the exciter to reverse its polarity under certain transient and fault conditions, as more fully explained hereinafter. Reversal of the polarity of the exciter is very undesirable, and can be prevented by the use of a cumulative series field winding in the exciter to provide cumulative compounding. The use of such a series field winding, however, introduces a further problem, especially in machines designed for operation over a wide speed range, since if sufficient compounding is provided to prevent polarity reversal, the exciter may be over-excited at high speed to such an extent that the voltage regulator, which controls only the shunt field current, will lose control with resulting instability of the system. The problem of preventing polarity reversal of the exciter in a system of the type described, therefore, is a difficult one, and no satisfactory solution has been available heretofore.

The principal object of the present invention is to provide an excitation system for alternating-current generators in which there is no tendency for the exciter to reverse its polarity, under any conditions, and in which no instability due to loss of control by the voltage regulator can occur.

Another object of the invention is to provide an excitation system for alternating-current generators in which reversal of the exciter polarity is prevented by a series field winding on the exciter to provide cumulative compounding, and in which means are provided for neutralizing most or all of the magneto-motive force of the series winding under normal conditions, the neutralizing means being ineffective under transient or fault conditions, when the tendency to polarity reversal would exist, so that the series field winding is fully effective at such times to prevent reversal.

A further object of the invention is to provide a direct-current exciter having a series field winding which is cumulative with the main shunt field winding and also having a differential shunt field winding which opposes the series field winding, so that the series winding is neutralized, in whole or in part, under normal conditions but under transient or fault conditions, when the voltage across the exciter armature approaches zero, the differential shunt winding becomes relatively ineffective and the series field winding is fully effective to prevent polarity reversal.

The invention will be more fully understood from the following detailed description, taken in connection with the accompanying drawing, the single figure of which is a schematic wiring diagram showing an excitation system embodying the invention.

The invention is shown in the drawing embodied in an excitation system for an alternating-current generator 1 having an armature member 2 and a field winding 3. The alternator 1 may be an aircraft generator driven from a main engine of an airplane, or any other suitable prime mover, either at varying speed if a variable frequency system is to be supplied or at constant speed if constant frequency is desired. The alternator 1 may be of any suitable or usual construction, and may supply any type of alternating-current system since the invention is not limited to aircraft systems.

The alternator field winding 3 is excited with direct-current by means of an exciter 4, which may be driven from the shaft of the alternator 1 or in any other suitable manner. The exciter 4 is a direct-current generator, of any usual or suitable physical construction, and has an armature member 5 and a main shunt field winding 6 connected across the armature 5. The exciter may also have the usual interpole and compensating windings, indicated as a single series winding 7. The shunt field winding 6 is shown in a short shunt connection, but a long shunt connection might equally well be used if desired. The current in the main shunt field winding 6 is controlled by means of a voltage regulator 8 to control the output voltage of the exciter and thus the excitation of the alternator field winding 3, which determines the output voltage of the alternator. The voltage regulator 8 may be of any suitable type and is shown as being a carbon pile regulator having a carbon pile 9 connected in series with the field winding 6. The resistance of the carbon pile is varied by varying the pressure applied to it by means of a pressure device 10, of any suitable type, which is actuated by a coil 11 acting in opposition to a spring 12. The coil 11 may be excited in response to the output voltage of the alternator 1 in any desired manner, and for simplicity is shown as being connected directly across the output leads 13 of the alternator 1 through a three-phase rectifier bridge 14. It will be understood that more elaborate regulating systems, employing a feed-back signal from the exciter for greater stability, may be used without affecting the operation of the invention.

The excitation system as so far described is more or less usual, and in accordance with the present invention the exciter 4 is provided with additional field windings to prevent the tendency to polarity reversal, under certain conditions, mentioned above. For this purpose, the exciter is provided with a series field winding 15 which is connected so as to be cumulative with the main shunt field winding 6. A differential shunt field winding 16 is also provided, connected across the exciter armature 5, and arranged so that its magneto-motive force opposes the magneto-motive forces of the series field winding 15 and the main shunt field winding 6, the relative directions of current flow in the various field windings being indicated by arrows on the drawing. The field windings 15 and 16 are preferably placed on the main poles of the exciter with the main shunt field winding 6.

In order to understand the purpose and effect of the arrangement described, consider first an excitation system having a conventional direct-current exciter without the additional field windings 15 and 16. If a heavy alternating-current load is suddenly applied to the alternator 1 when it is running at no load and rated voltage, or if a short circuit or fault occurs on the generator leads 13, a magneto-motive force is set up in the generator direct axis which has a demagnetizing effect on the field winding 3. This results in an immediate increase in the current in the field winding circuit because of the self-induced voltage in the field winding 3, which tends to oppose the change in flux. Thus, the effect of a short circuit or a sudden large increase in load on the alternator 1 is to cause an immediate transient increase in the current in the field winding circuit. The field winding current will remain at a value higher than its previous value for a substantial period, such as several cycles, the exact time depending on the time constant of the alternator field winding 3.

This relatively large current flowing through the series circuit consisting of the alternator field winding 3 and the exciter armature 5 produces a substantial voltage drop across the armature 5, caused by the current flowing through the brush contact resistance and the resistance of the armature itself. If the current thus flowing is large enough, the sum of the voltage drops in the exciter armature circuit may be greater than the generated voltage of the armature 5. If this occurs, the direction of current in the exciter main shunt field 6 will immediately reverse, and the exciter voltage will build up to its maximum in the reverse direction. Thus, with the conventional excitation system there is a strong tendency for the exciter to reverse its polarity under the transient conditions resulting from a fault or a sudden large increase in load on the alternator, which is highly undesirable. Even if the reversal tendency is not great enough to actually reverse the polarity, it may be large enough to substantially demagnetize the magnetic circuit of the exciter 4, so that the residual voltage of the exciter is lost and the exciter will not thereafter build up unless the field is momentarily excited with direct current from some external source.

If the exciter 4 is provided with the cumulative series field winding 15 in accordance with the present invention, however, it will be seen that as the current in the series circuit of the field winding 3 and armature 5 increases, the cumulative compounding effect of the series field winding 15 also increases in proportion to the current. Thus, the generated voltage in the exciter armature 5 increases as the current increases, and will always remain higher than the voltage drop across the armature. It will be apparent, therefore, that the use of the series field winding 15 positively prevents any tendency to polarity reversal. If the series field winding 15 only were added to the conventional shunt exciter, however, there would be serious risk of instability under some conditions, especially in machines designed for operation over a wide speed range, since the increase in compounding effect at high speeds would tend to overexcite the machine, and since the voltage regulator 8 controls only the current in the shunt field winding 6, the regulator would be likely to lose control with resulting instability.

In order to avoid the possibility of instability which may result from the series field winding 15, the differential shunt field winding 16 is also provided, and is connected, as shown, across the exciter armature 5 with its flux opposing the flux of the series field winding 15. Under normal conditions, therefore, the differential shunt field winding 16 opposes the series field winding 15, and it is designed to neutralize the effect of the series field winding, either entirely or to as great an extent as desired. Under the transient or fault conditions described above, however, when there is a tendency for the exciter 4 to reverse its polarity, the net voltage across the armature 5 becomes very small and approaches zero, so that the excitation of the differential shunt field 16 decreases to a negligible amount, and it is ineffective to oppose the series field 15. Under these conditions, therefore, the series field 15 is fully effective to prevent polarity reversal in the manner described above. Under normal steady-state conditions, over-excitation and instability are prevented by the effect of the differential shunt field 16 which neutralizes the series field 15, to as great an extent as desired, at all times, since the ratio of the strengths of these two fields is substantially constant, under normal conditions, as the currents in both fields are determined solely by the exciter output voltage.

A tendency to reversal of the exciter polarity may also exist during the initial build-up of the alternator, when the exciter shunt field circuit is closed, with the alternator running at rated speed, to apply excitation to the alternator and bring it up to rated voltage. When this is done, the alternating current output voltage of the alternator may build up far above its desired value, for which the regulator is set, and then settle down to the proper value. Thus, considering first a conventional exciter without the field windings 15 and 16, when the exciter field circuit is closed, the exciter will start to build up as a shunt generator. The carbon pile regulator 8 at this time will have minimum resistance and will permit the generated voltage of the alternator to overshoot, that is, to rise above the desired value for which the reguraltor is set. This is because the regulator does not receive a signal to increase its resistance, to reduce the exciter shunt field current, until the alternator field current is passing through its steady-state value corresponding to the desired alternator output voltage. The exciter output voltage, however, leads the current, because of the inductance of the alternator field, so that the exciter voltage is above the desired steady-state value when the alternator field current passes through the corresponding value, and thus the current is driven still higher. The regulator begins to act to increase the resistance in the exciter field circuit at this time, but because of the inherent delays in the regulator operation, due to mechanical inertia of the parts and unavoidable mechanical and electrical damping, the regulator cannot decrease the exciter voltage quickly enough to prevent the alternator field current from going still higher. When the regulator does act, therefore, it increases its resistance to the maximum and may, in effect, open the exciter shunt field winding circuit, so that the exciter field excitation is rapidly reduced to substantially zero, and the exciter generated voltage drops very rapidly. The alternator field current, however, will continue to flow for an appreciable time because of the self-induced voltage in the alternator field winding, the time being determined by the time constant of the alternator field.

The regulator closes the exciter shunt field circuit again when the alternator output voltage drops and approaches its normal value. The exciter may reverse its polarity at this time, because the current flowing in the circuit of the alternator field winding and exciter armature 5 produces a voltage drop across the exciter armature, in the same manner as previously described, which may be greater than the generated voltage in the exciter armature at this time. It is also possible that the exciter flux may become reversed while the shunt field circuit is open because of a differential compounding effect of the armature conductors undergoing commutation. In either case, if the regulator closes the shunt field circuit on a negative voltage across the shunt field terminals, the polarity of the exciter will reverse. It will be seen that the phenomenon is fundamentally the same as that described above in connection with fault conditions. If the exciter is provided with the series field winding 15 and differential shunt field winding 16, therefore, the effect of these windings is the same as previously described and polarity reversal is prevented in the same way. That is, the series field winding 15 provides cumulative compounding and thus increases the generated voltage of the exciter armature 5 as the current increases, so that the generated voltage is always higher than the voltage drop across the armature 5, while the shunt field winding 16, which opposes the series winding 15 under normal conditions, is relatively ineffective during the transient conditions described, since the voltage from which it is excited is close to zero at that time.

The differential shunt field winding 16 has another important effect during the transient build-up period just described. When the regulator begins to act to decrease the exciter voltage, it cannot act quickly enough to prevent the alternator field current and output voltage from going still higher, because of the time lag in the regulator itself, as explained above, and the time constant of the exciter shunt field winding. With the series field winding 15 and differential shunt field winding 16 on the exciter, however, the rate at which the exciter voltage will build up is decreased, because the current in the differential field winding 16 will build up more rapidly than that in the circuit of the alternator field winding 3, which is a larger winding with a considerably greater time constant. The result of this is that during the build-up of the exciter voltage, the differential field winding 16 is momentarily stronger than the main shunt field winding 6, which tends to slow down the rate of build-up of the exciter voltage so that the alternator output voltage builds up more slowly and the regulator has more time in which to act. The amount of overshoot of the alternating-current output voltage, or the amount by which it exceeds the desired voltage, is therefore decreased. This is highly desirable because it reduces the probability of overvoltage protective devices operating during the transient build-up period.

It should now be apparent that an excitation system has been provided for alternating-current generators which positively prevents the tendency to polarity reversal of the exciter which occurs in conventional excitation systems under certain fault and transient conditions. This result is obtained in a relatively simple manner without causing any tendency to overexcitation or instability of the system. A particular embodiment of the invention has been shown and described for the purpose of illustration, but it will be apparent that other embodiments and modifications are possible within the scope of the invention, and it is to be understood, therefore, that the invention is not limited to the specific arrangement shown, but in its broadest aspects it includes all equivalent embodiments and modifications which come within the scope of the appended claims.

I claim as my invention:

1. An excitation system for an alternating-current generator having a field winding, said excitation system including a direct-current generator having an armature member and a field member, said armature member being connected to the alternating-current generator field winding to supply direct-current excitation thereto, and said field member having thereon a main shunt field winding, means for providing a component of excitation cumulative with that of the main shunt field winding and proportional to the current in the series circuit of the armature member and the alternating-current generator field winding, and means for providing a differential component of excitation opposing said last-mentioned component and proportional to the voltage of the armature member.

2. An excitation system for an alternating-current generator having a field winding, said excitation system including a direct-current generator having an armature member and a field member, said armature member being connected to the alternating-current generator field winding to supply direct-current excitation thereto, and said field member having thereon a main shunt field winding, means for providing a component of excitation cumulative with that of the main shunt field winding and proportional to the current in the series circuit of the armature member and the alternating-current generator field winding, and means for providing a differential component of excitation opposing said last-mentioned component and adapted to neutralize at least a major part of the last-mentioned excitation component under normal steady-state conditions, the differential excitation component being relatively ineffective under transient or fault conditions when the voltage of the armature member approaches zero.

3. An excitation system for an alternating-current generator having a field winding, said excitation system including a direct-current generator having an armature member and a field member, said armature member being connected to the alternating-current generator field winding to supply direct-current excitation thereto, and said field member having thereon a main shunt field winding, a series field winding, and a differential shunt field winding, said series field winding being connected in the series circuit of the armature member and the alternating-current generator field winding and being cumulative with the main shunt field winding, and said differential shunt field winding being excited in accordance with the voltage of the armature member and opposing the series field winding.

4. An excitation system for an alternating-current generator having a field winding, said excitation system including a direct-current generator having an armature member and a field member, said armature member being connected to the alternating-current generator field winding to supply direct-current excitation thereto, and said field member having thereon a main shunt field winding, a series field winding, and a differential shunt field winding, said series field winding being connected in the series circuit of the armature member and the alternating-current generator field winding and being cumulative with the main shunt field winding, and said differential shunt field winding opposing the series field winding and being adapted to neutralize at least a major part of the flux of the series field winding under normal steady-state conditions and to be relatively ineffective under transient or fault conditions when the voltage of the armature member approaches zero.

5. An excitation system for an alternating-current generator having a field winding, said excitation system including a direct-current generator having an armature member and a field member, said armature member being connected to the alternating-current generator field winding to supply direct-current excitation thereto, and said field member having thereon a main shunt field winding, a series field winding, and a differential shunt field winding, said series field winding being connected in the series circuit of the armature member and the alternating-current generator field winding and being cumulative with the main shunt field winding, and said differential shunt field winding being connected across the armature member and opposing the series field winding, the differential shunt field winding being adapted to neutralize at least a major part of the flux of the series field winding under normal steady-state conditions.

6. An excitation system for an alternating-current generator having a field winding, said excitation system including a direct-current generator having an armature member and a field member, said armature member being connected to the alternating-current generator field winding to supply direct-current excitation thereto, and said field member having thereon a main shunt field winding connected across the armature member, a series field winding, and a differential shunt field winding, said series field winding being connected in the series circuit of the armature member and the alternating-current generator field winding and being cumulative with the main shunt field winding, and said differential shunt field winding being excited in accordance with the voltage of the armature member and opposing the series field winding, the differential shunt field winding being adapted to neutralize at least a major part of the flux of the series field winding under normal steady-state conditions and to be relatively ineffective under transient or fault conditions when the voltage of the armature member approaches zero, and means responsive to the voltage of the alternating-current generator for controlling the current in the main shunt field winding.

7. An excitation system for an alternating-current generator having a field winding, said excitation system including a direct-current generator having an armature member and a field member, said armature member being connected to the alternating-current generator field winding to supply direct-current excitation thereto, and said field member having thereon a main shunt field winding connected across the armature member, a series field winding, and a differential shunt field winding, said series field winding being connected in the series circuit of the armature member and the alternating-current generator field winding and being cumulative with the main shunt field winding, and said differential shunt field winding being connected across the armature member and opposing the series field winding, and means responsive to the voltage of the alternating-current generator for controlling the current in the main shunt field winding.

8. A direct-current generator having relatively rotatable field and armature members, said field member having thereon a main shunt field winding, a series field winding cumulative with the main shunt field winding, and a differential shunt field winding opposing said series field winding, said differential shunt field winding being adapted to neutralize at least a major part of the flux of the series field winding under normal steady-state conditions.

9. A direct-current generator having relatively rotatable field and armature members, said field member having thereon a main shunt field winding excited from the voltage of the generator, a series field winding connected in series with the armature of the generator and connected to be cumulative with said main shunt field winding, and a differential shunt field winding excited from the generator voltage and connected to oppose said series field winding, said differential shunt field winding being adapted to neutralize at least a major part of the flux of the series field winding under normal steady-state conditions.

References Cited in the file of this patent

UNITED STATES PATENTS

| 2,247,166 | Edwards et al. | June 24, 1941 |

FOREIGN PATENTS

| 295,772 | Great Britain | Aug. 23, 1928 |
| 423,522 | Great Britain | Feb. 4, 1935 |
| 623,765 | Great Britain | May 23, 1949 |